No. 826,822.　　　　　　　　　　　　　　PATENTED JULY 24, 1906.
A. AKER.
WEIGHING APPLIANCE FOR ELEVATORS.
APPLICATION FILED NOV. 17, 1905.

2 SHEETS—SHEET 1.

Witnesses

Anton Aker, Inventor.
by C. A. Snow & Co.
Attorneys

No. 826,822. PATENTED JULY 24, 1906.
A. AKER.
WEIGHING APPLIANCE FOR ELEVATORS.
APPLICATION FILED NOV. 17, 1905.

2 SHEETS—SHEET 2.

Witnesses

Anton Aker,
Inventor,
by C.A. Snow & Co
Attorneys

UNITED STATES PATENT OFFICE.

ANTON AKER, OF HELENA, MONTANA, ASSIGNOR OF ONE-FOURTH TO EDWARD HORSKY, OF HELENA, MONTANA.

WEIGHING APPLIANCE FOR ELEVATORS.

No. 826,822.     Specification of Letters Patent.     Patented July 24, 1906.

Application filed November 17, 1905. Serial No. 287,895.

To all whom it may concern:

Be it known that I, ANTON AKER, a citizen of the United States, residing at Helena, in the county of Lewis and Clark and State of Montana, have invented a new and useful Weighing Appliance for Elevators, of which the following is a specification.

This invention relates to weighing devices, and has for its principal object to provide a means for weighing a load received on an elevator.

A further object of the invention is to provide a load-weighing device for elevators in which the receiving-platform of the weighing device or scale is normally held on a fixed support—such, for instance, as the bottom frame of the elevator-car—and the weight-indicating mechanism is not operated or moved in any manner during the placing of the load on the platform or its removal therefrom.

A still further object of the invention is to provide a weighing-scale of simple construction in which the weight-indicator is normally held in inoperative position and is not allowed to move until the load has been received on the platform.

With these and other objects in view, as will more fully hereinafter appear, the invention consists in certain novel features of construction and arrangement of parts hereinafter fully described, illustrated in the accompanying drawings, and particularly pointed out in the appended claim, it being understood that various changes in the form, proportions, size, and minor details of the structure may be made without departing from the spirit or sacrificing any of the advantages of the invention.

Figure 1:
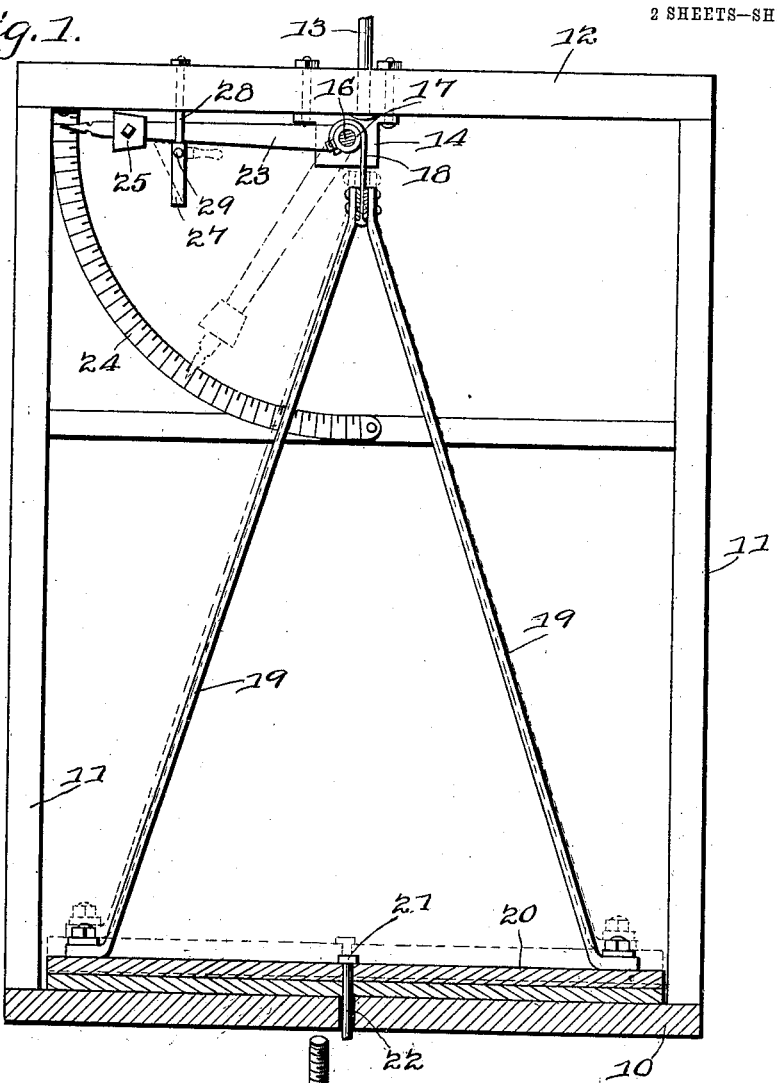
Figure 3:
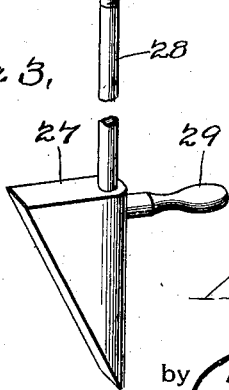
Figure 2:
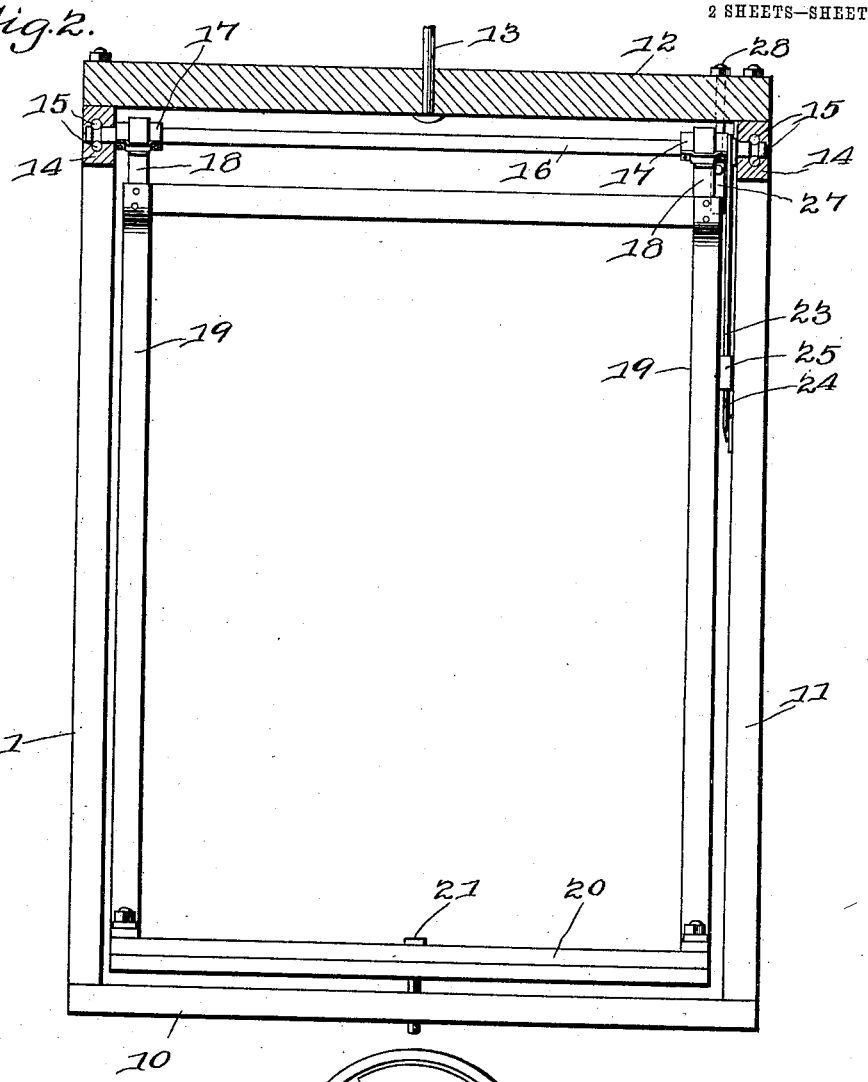
Figure 4:
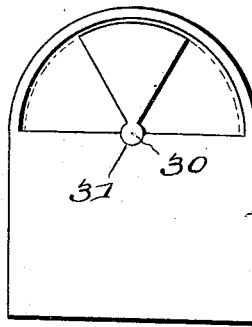

In the accompanying drawings, Figure 1 is a side elevation, partly in section, of a load-weighing device for elevators constructed in accordance with the invention. Fig. 2 is a front elevation of the same, partly in section. Fig. 3 is a detail perspective view of the indicator-locking device. Fig. 4 is an elevation illustrating a modified construction of bearing for the main fulcrum of the weighing device.

Similar numerals of reference are employed to indicate corresponding parts throughout the several figures of the drawings.

The frame of the elevator may be of any ordinary construction and includes in the present instance a platform 10, uprights 11, and a top frame 12, which may be secured to a hoisting member 13.

The upper portion of the frame is provided with bearing-blocks 14, having bearing-balls 15 for the reception of a horizontally-disposed shaft 16, the shaft being preferably provided with annular grooves adjacent to its opposite ends for the reception of the balls.

Near the opposite ends of the shaft 16 are secured winding-drums 17, to which are secured the ends of flexible suspension members 18, and the lower ends of these members are secured to inclined tension-rods 19. The lower ends of the rods 19 are secured to the scale-platform 20, which rests against the bottom 10 of the elevator or other fixed support during the reception or removal of the load and during the raising and lowering of the elevator. In order to hold the scale-platform from swaying movement, said platform is provided with a pin 21, which extends through a suitable guiding-opening 22, formed in the bottom 10 of the elevator.

Secured to one end of the shaft 16 is an indicating arm or pointer 23, the outer end of which is adapted to travel over a graduated arc 24, that is secured to the frame of the elevator, and mounted in this indicating-arm 23 is a weight or poise 25, which may be adjusted toward and from the shaft 16 for the purpose of counterbalancing the weight of the scale-platform and the members between the platform and the shaft. If left free, the indicating-arm 23 would descend over the arc and indicate thereon the weight of any load placed on the platform, and in order to prevent this movement during the reception of the load the indicating-arm is held elevated and the scale-platform is lowered into contact with the bottom of the elevator by a latch 27, that is carried by a pin 28, and is provided with a suitable operating-handle 29, by which it may be turned to present the face of the latch under the indicating-arm or moved from under the arm in order to allow the latter to descend.

Prior to the reception of the load the attendant raises the indicating-arm to the highest point and turns the latch to the full-line position, (shown in Fig. 1,) so that the platform 20 will be lowered into contact with the bottom of the elevator. The load may then be placed on the platform without jar or shock, and after the reception of the load the attendant turns the latch 27 and frees the indicating-arm, the latter lowering to a position necessary to counterbalance the load and indicate its weight on the arc 24. After the load is raised the arm is again raised to inoperative position and the load-receiving platform lowered against the bottom of the elevator. The indicating-arm is then locked in place, and the elevator is operated in the usual manner to raise or lower the load.

In place of using the grooved shaft and ball-bearings, (shown in Fig. 2,) the opposite ends of the shaft may be cut away to form a knife-edge or to form a reduced circular bearing 30, arranged within a suitable seat 31, formed in a supporting-block 32, the object being to reduce the extent of frictional surfaces in engagement with each other, and thus render the scale more accurate.

Having thus described the invention, what is claimed is—

In apparatus of the class described, an elevator, a weighing-platform designed to rest against the bottom of the elevator during the reception of the load, a rock-shaft having supports at the top of the elevator-frame, tension-rods extending upward from the platform, flexible suspension devices extending from the rods to the shaft, a graduated arc carried by the frame, an indicating-arm secured to the shaft and movable over the arc, and a pivotally-mounted handled latch carried by the frame of the elevator and arranged to move under the arm and hold the latter in elevated inoperative position and retain the platform in depressed position.

In testimony that I claim the foregoing as my own I have hereto affixed my signature in the presence of two witnesses.

ANTON AKER.

Witnesses:
   CAILO C. TYRELL,
   MASSENA BULLARD.